United States Patent Office

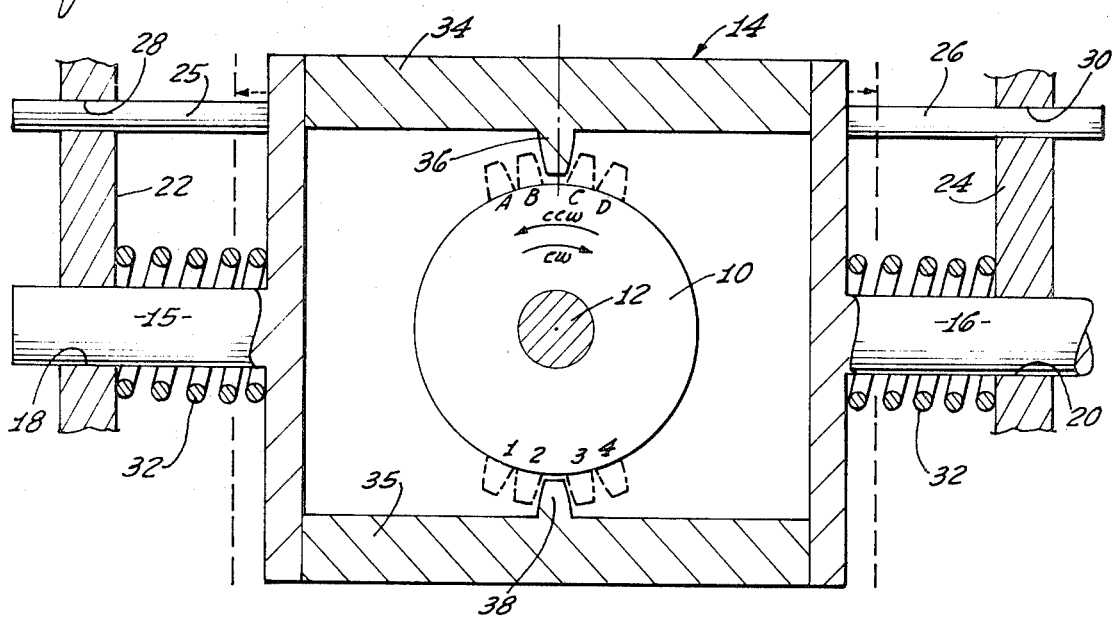
Fig. 1 (Neutral Position)
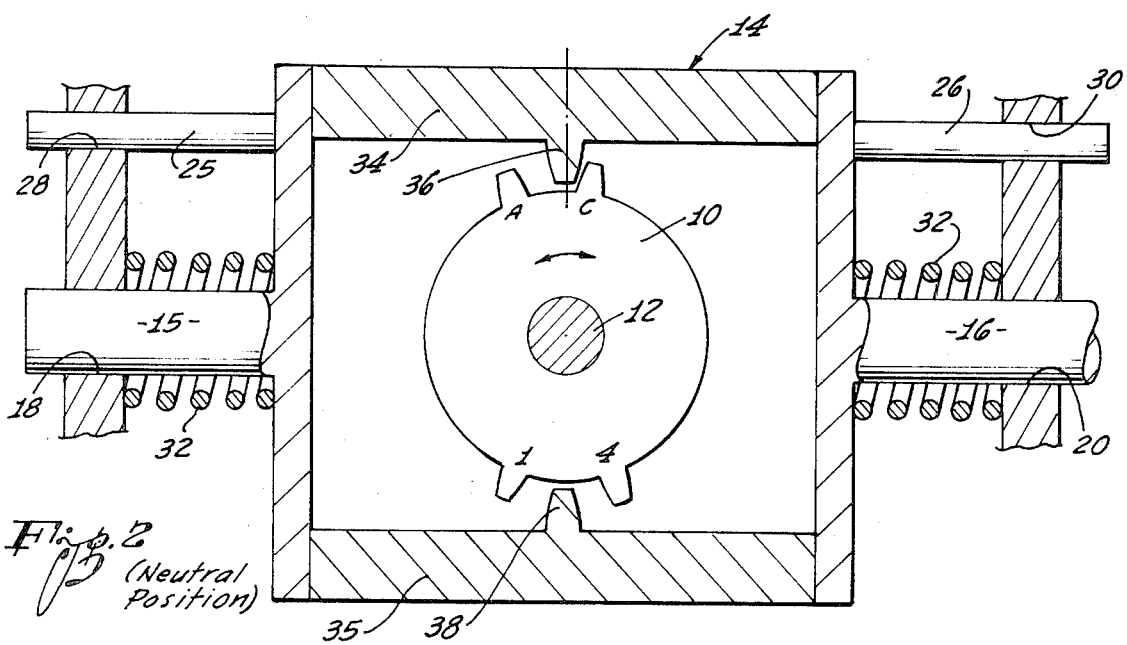
Fig. 2 (Neutral Position)

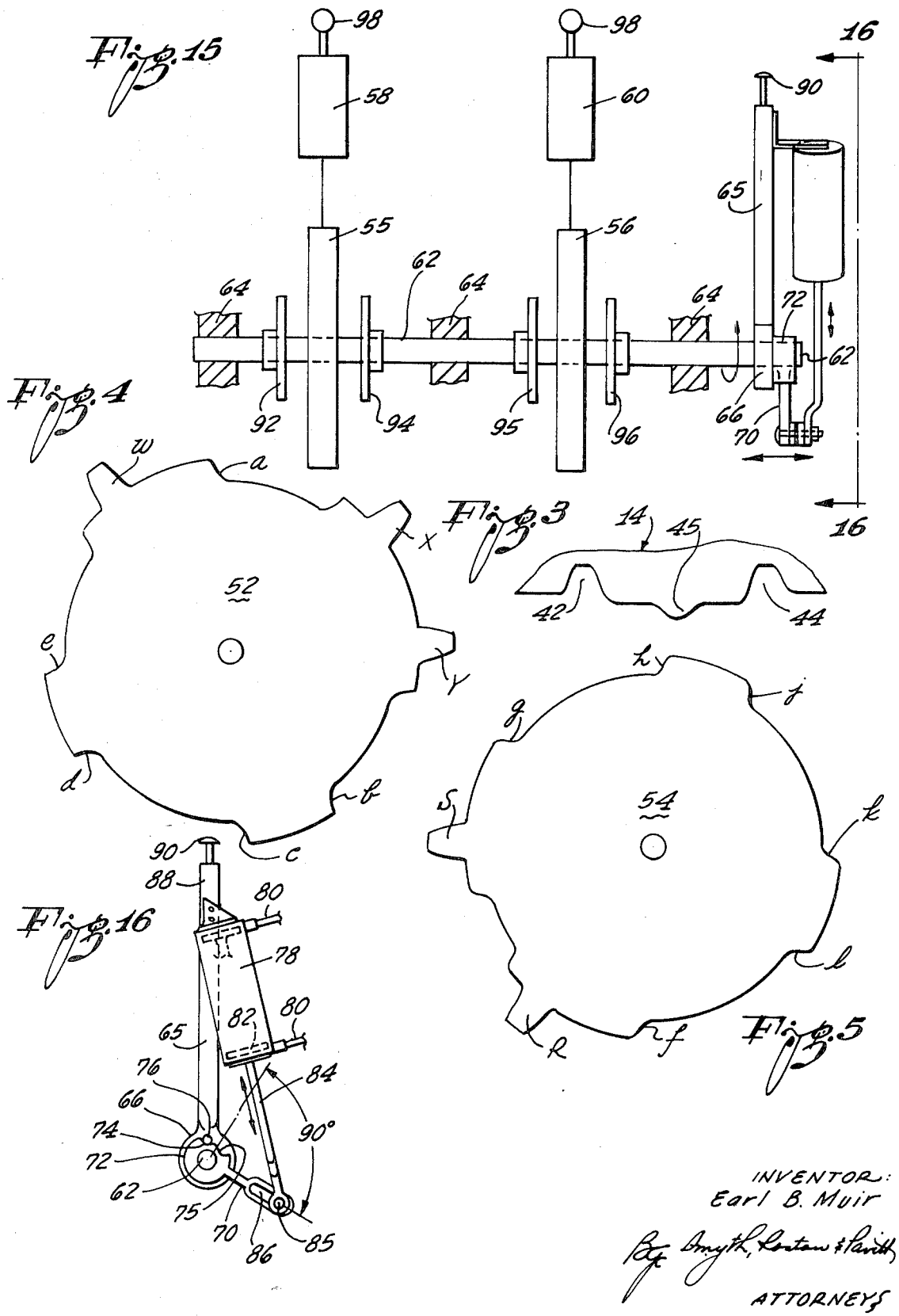

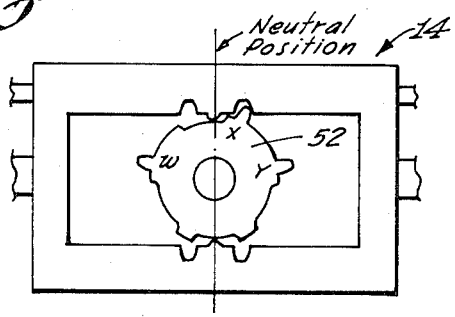
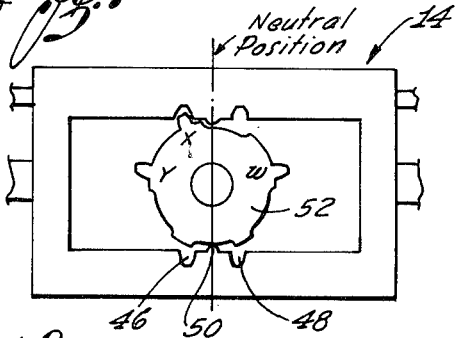
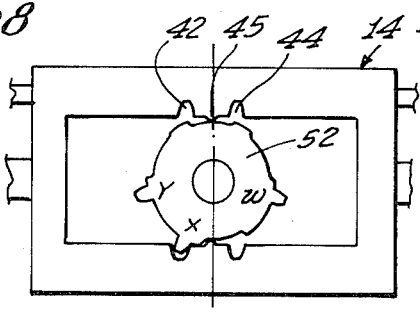
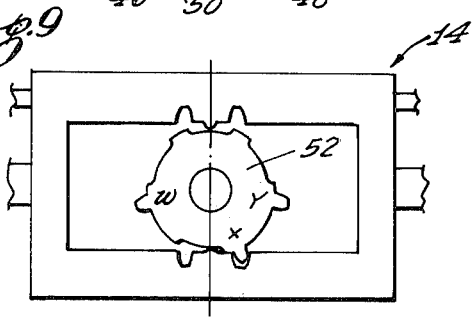
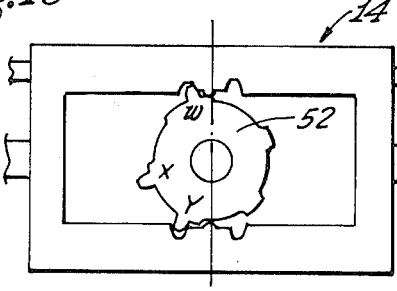
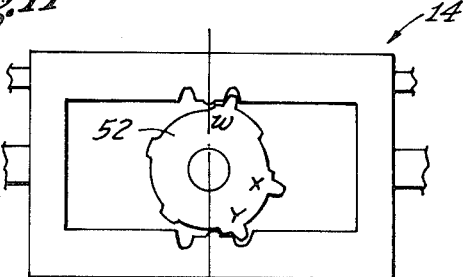
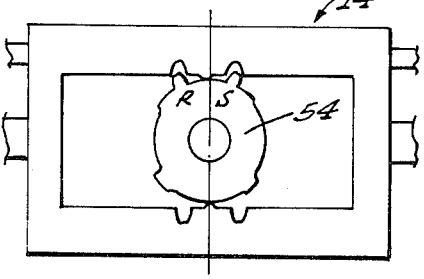
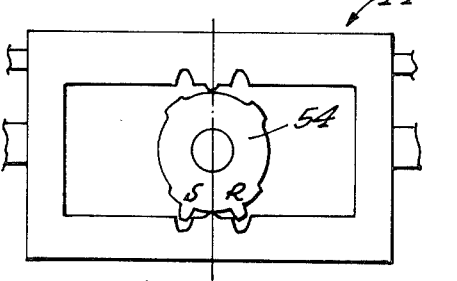
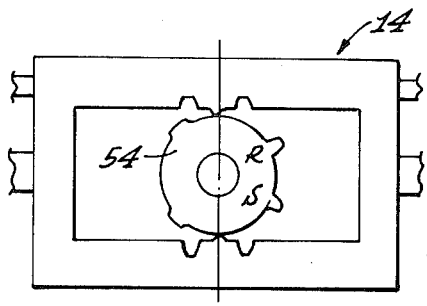

3,550,460
Patented Dec. 29, 1970

3,550,460
CONTROL MECHANISM
Earl B. Muir, Rolling Hills Estates, Calif., assignor to White Motor Corporation, Cleveland, Ohio, a corporation of Ohio
Filed Feb. 5, 1969, Ser. No. 796,709
Int. Cl. F16h *21/54*
U.S. Cl. 74—89                                21 Claims

ABSTRACT OF THE DISCLOSURE

A slide is movable from a neutral position to two opposite limit positions to operate, for example, a four-way valve. The slide is controlled by teeth of a disk that it straddles, the disk being manually rotatable to opposite limit positions from a neutral position to cause corresponding linear movement of the slide.

BACKGROUND OF THE INVENTION

Reversible movement may be utilized for numerous control purposes, including the operation of valves, switches, gear shifts, and the like. In many instances the movement is from an intermediate position to two opposite limit positions selectively, for example, to operate a double-throw switch or to operate the spool of a four-way valve.

For such purposes it is common to employ a manually operable control member in the form of a pivoted arm that may be swung in either direction from a central neutral position. In a very simple situation, the control arm may be directly connected to a valve or double-throw switch to cause the valve or switch to follow the particular movements of the control arm. The present invention, however, is directed to the problem of providing choice among the different modes of operation of a controlled member such as valve or switch in response to the movements of a control arm. This concept is useful, for example, when a control arm operates a plurality of separate valves or switches in different ways in a control operation.

The movement of the control arm in one direction from neutral may be intended to have any one of three different results, namely: movement of the controlled member in the same sense as the movement of the control arm; movement of the controlled member in the opposite sense from the movement of the control arm; and no response by the controlled member to the movement of the control arm. There are, therefore, nine possible modes of operation of the controlled member in response to movement of the control arm from its neutral position to its opposite limit positions in sequence.

The object of the present invention is to provide a control mechanism that is capable of producing any one of the nine modes of operation in response to the two opposite movements of the control arm from its neutral position. If only one member is to be controlled, the invention affords choice in the mode of operation that is to be employed. If a plurality of switches or valves are to be controlled simultaneously with different modes of operation, the invention provides different modifications of a basic control mechanism to operate all of the switches or valves in their various modes simultaneously by one control arm.

A further object of the invention is to provide a control mechanism of such construction that the mode of operation thereof may be changed by simply replacing one component of the control mechanism.

SUMMARY OF THE INVENTION

The control mechanism comprises a control member in the form of a rotary disk that is operated by a control arm and a controlled member in the form of a slide that is connected to the valve, switch, or the like that is to be controlled. The slide or controlled member is of open rectangular construction with two laterally spaced longitudinal portions that straddle the control disk for actuation by peripheral teeth of the control disk.

The mode of operation or response of the slide to rotation of the control disk is determined by the location of the teeth on the control disk and nine different disks may be provided for the nine different modes of operation. A feature of the preferred practice of the invention, however, is that only two disks are required. Both disks may be oriented at different starting positions, i.e. different "neutral" positions for some of the nine different modes of operation and in addition one of the two disks may be simply reversed for other of the nine modes of operation.

To give an operator some choice among the modes of operation of a slide, a plurality of control disks may be mounted on a common shaft that is operated by the control arm and the shaft may be axially movable to shift the various disks into and out of engagement with the slide. The operator may also be given choice among modes of operation by using a given disk to control a slide with provision for changing the position of the disk to a new orientation at the neutral position of the slide. For this purpose the shaft that carries the disk may be axially movable to permit the disk to be retracted from the slide temporarily for the required rotation of the disk to a new starting position.

It is also possible to employ a plurality of control disks for cooperation with a given slide interchangeably for different modes of operation of the slide and in addition to provide for turning the different disks to different starting positions for additional modes of operation. For this purpose, the shaft that carries the plurality of disks is axially movable and in addition the rotary positition of the shaft relative to the control arm may be changed when it is desired to rotate the disks to new starting positions.

In the first of two embodiments of the invention disclosed herein, the slide component of the control mechanism is spring-biased to seek its normal neutral position and each of the two longitudinal portions of the slide that lie on opposite sides of the control disk has a single tooth for engagement by peripheral teeth of the control disk. The disk teeth shift the slide out of its neutral position but the slide is returned to its neutral position by spring means.

If desired, the control disk may be provided with additional teeth to cooperate with the teeth of the slide to stop the slide at its limit position. Also, if desired, additional peripheral teeth may be provided on the control disk to cooperate with the teeth of the slide to lock the slide in its neutral position in response to rotation of the control disk to a limit position.

In the second embodiment of the invention, the two longitudinal side portions of the slide have shoulders in outer circumferential zones, the shoulders being formed by recesses in the slide and in addition the slide has shoulders in inner longitudinal zones, the latter shoulders being formed by lugs that extend inward towards the control disk. For cooperation with this slide, the control disk has shoulders in an outer radial zone to cooperate with the outer zone shoulders of the slide, the outer radial shoulders of the control disk being formed by peripheral teeth that are dimensioned to enter the recesses of the slide. In addition, the control disk has inner radial shoulders to cooperate with the inner zone shoulders of the slide, i.e., to cooperate with the lugs of the slide.

Since the peripheral teeth of the control disk cooperate with recesses in the slide, the peripheral teeth are not only capable of shaifting the slide from neutral position to a limit position, but also are capable of returning the slide to its neutral position in a positive manner. Thus, the second embodiment of the invention avoids the necessity of using springs to return the slide to its neutral position.

The function of the shoulders in the inner radial zone of the controlled disk is to cooperate with the two lugs of the slide either to block further movement of a slide at a limit position of the slide, or to cooperate with the lugs of the slide to lock the slide in its neutral position in response to rotation of the control disk to one of its two limit positions.

The features and advantages of the invention may be understood from the following detailed description and the accompanying drawings.

BRIEF DESCRIPTION OF THE DRAWINGS

In the drawings, which are to be regarded as merely illustrative:

FIG. 1 is a diagrammatic view relating to the first embodiment of the invention. The diagram shows in dotted lines eight possible locations for peripheral teeth on the control disk, only some of the eight tooth locations being required for any one of the nine modes of operation of the slide;

FIG. 2 is a view similar to FIG. 1 showing, by way of example, how the control disk may be provided with four teeth for carrying out one of the nine modes of operation;

FIG. 3 is a fragmentary elevational view showing how the slide in the second embodiment of the invention is provided with shoulders in an outer longitudinal zone formed by recesses in the slide and is additionally provided with shoulders in an inner longitudinal zone formed by a lug projecting from the slide.

FIG. 4 is an elevational view showing the profile of one of the two control disks that may be employed in the second embodiment of the invention for carrying out some of the nine modes of operation;

FIG. 5 is a similar view of the second control disk that may be employed to carry out the remaining of the nine modes of operation;

FIGS. 6 through 14 show how the two disks shown in FIGS. 4 and 5 may be variously employed to carry out the nine modes of operation of the second embodiment of the invention;

FIG. 15 is a diagrammatic plan view showing how the invention may be employed to operate two four-way valves in different ways for different purposes; and FIG. 16 is an end elevation of the structure shown in FIG. 15, as seen along the line 16—16, the view indicating how the rotary position of the control shaft may be varied relative to the control arm that is mounted on the shaft.

DESCRIPTION OF THE PREFERRED EMBODIMENTS OF THE INVENTION

In FIGS. 1 and 2 relaing to the first embodiment of the invention, the first view shows diagrammatically all of the possible locations of teeth on the rotary control member and FIG. 2 shows, by way of example, how four of the eight possible tooth locations may be employed to carry out one of the nine modes of operation of the control mechanism. Both views show a rotary control member in the form of a disk 10 on a control shaft 12. As will be made clear in describing the second embodiment of the invention, the control shaft 12 may be provided with a suitable radial control arm which may be swung clockwise from a neutral position to a first limit position and may be swung counterclockwise from the neutral position to a second limit position to cause corresponding rotation of the control disk 10.

The control disk 10 operates a controlled member in the form of a slide, generally designated 14, which is suitably mounted for longitudinal movement in opposite directions from a central neutral position. In the construction shown, two opposite longitudinal rods 15 and 16 that are integral with the slide are slidable in corresponding bores 18 and 20 in corresponding fixed structures 22 and 24 and to prevent rotation of the slide, additional opposite rods 25 and 26 extend through corresponding bores 28 and 30 in the two fixed structures.

It is contemplated that the slide 14 will be spring-biased to seek its neutral position. For this purpose coil springs 32 may be mounted on the two rods 15 and 16 respectively to act in compression between the slide 14 and the two fixed structures 22 and 24 respectively.

The slide 14 is of open rectangular construction with two longitudinal side portions 34 and 35 respectively that straddle the rotary control disk 10. The longitudinal side portion 34 has a single central tooth 36 extending towards the rotary control disk 10 and in like manner the second longitudinal side portion 35 has a tooth 38, each tooth forming two oppositely facing shoulders for cooperation with the rotary control disk.

It is contemplated that the control disk 10 will be provided with radial teeth for cooperation with the slide teeth 36 and 38 to carry out the nine possible modes of operation. For this purpose there are eight possible locations for disk teeth shown in dotted lines in FIG. 1, there being four possible tooth locations designated A, B, C, and D for cooperation with the slide tooth 36 and four possible tooth locations designated 1, 2, 3, and 4 for cooperation with the slide disk 38.

In a simple practice of the invention, no more than two teeth are required on the rotary control disk 10 for any of the nine modes of operation because the disk is not required either to stop the slide at a limit position or to lock the slide at its neutral position. Preferably, however, four disk teeth are selected for each of the nine modes of operation to permit the rotary disk to limit the rightward and leftward shifts of the slide 14 and when desired to permit the disk to lock the slide in its neutral position in response to rotation of the control disk to one of its limit positions.

Table I designates in one column the minimum disk teeth for each of the nine modes of operation and in a second column designates the additional disk teeth required for each of the nine modes of operation if limiting and locking action by the control disk is desired.

TABLE I

| Mode of operation | Response of slide to clockwise rotation of the control disk | Response of slide to counter-clockwise rotation of the control disk | Minimum teeth | Optional additional teeth |
|---|---|---|---|---|
| 1 | Stays in neutral | Shifts left | C | A, #1, #4 |
| 2 | Shifts right | Stays in neutral | B | D, #1, #4 |
| 3 | Stays in neutral | Shifts right | #2 | A, D, #4 |
| 4 | Shifts left | Stays in neutral | #3 | A, D, #1 |
| 5 | Shifts right | Shifts right | B, #2 | D, #4 |
| 6 | Shifts left | Shifts left | C, #3 | A, #1 |
| 7 | Shifts right | do | B, C | #1, #4 |
| 8 | Shifts left | Shifts right | #2, #3 | A, D |
| 9 | Remains in neutral | Remains in neutral | No teeth | A, D, #1, #4 |

By way of example, FIG. 2 shows that disk teeth A, C, 1 and 4 may be employed for the first mode of operation in Table I where the slide 14 remains in neutral when the control disk is rotated clockwise from its neutral position and is moved to its left limit position in response to counterclockwise rotation of the disk. It may be seen in FIG. 2 that clockwise rotation of the disk from its neutral position terminates when teeth A and 4 simultaneously abut the slide teeth 36 and 38 respectively to lock the slide in its neutral position in a positive manner. When the disk is rotated counterclockwise from its neutral position, disk tooth C contacts the slide tooth 36 to shift the slide leftward until disk tooth 1 abuts the slide tooth 38 at the left limit position of the slide to block further leftward movement of the slide.

As indicated in Table I, the first mode of operation may be carried out by providing the disk 10 with only tooth C. With the single tooth clockwise rotation of the disk does not affect the slide and the single tooth shifts the slide to the left in response to counterclockwise rotation of the control disk. If only the single tooth is employed, it is desirable to provide suitable means either to stop rotation of the shaft 12 at the end of the desired left limit position of the slide or, for the same purpose, to provide means to block leftward movement of the slide itself at the desired left limit position.

As shown in Table I, the second mode of operation of the control mechanism may be carried out by employing a single disk tooth B to shift the slide rightward in response to clockwise rotation of the control disk, the slide being nonresponsive to counterclockwise rotation of the disk. Table I also shows that disk tooth 4 may be added to cooperate with disk tooth B by contacting slide tooth 38 to limit the rightward shift of the slide and disk teeth D and 1 may be added to cooperate with slide teeth 36 and 38 respectively to lock the slide in neutral in response to counterclockwise rotation of the disk.

In the third mode of operation in Table I, only disk tooth 2 is required to cooperate with slide tooth 38 to shift the slide to the right in response to counterclockwise rotation of the disk, but disk tooth D may be added to contact slide tooth 36 to limit the rightward shift of the slide and disk teeth A and 4 may be added to cooperate with slide teeth 36 and 38 respectively to lock the slide in neutral position in response to clockwise rotation of the disk.

For the fourth mode of operation only disk tooth No. 3 is required to cooperate with the slide tooth 38 for leftward shift of the slide in response to clockwise rotation of the disk, but disk tooth A may be added to contact slide shoulder 36 to limit the leftward shift of the slide and disk teeth D and 1 may be added to cooperate with slide teeth 36 and 38 respectively to lock the slide in its neutral position in response to counterclockwise rotation of the disk.

To carry out the fifth mode of operation, disk tooth B is required to cooperate with slide tooth 36 for rightward movement of the slide in response to clockwise rotation of the disk and disk tooth 2 is required for cooperation with slide tooth 38 for rightward movement of the slide in response to counterclockwise rotation of the disk. Disk tooth 4 may be added to contact slide tooth 38 to limit the rightward shift of the slide by disk tooth B and disk tooth D may be added to contact slide tooth 38 to limit rightward shift of the slide by disk tooth 2.

For the sixth mode of operation, disk tooth 3 is required to shift the slide leftward in response to clockwise rotation of the disk and disk tooth C is required to shift the slide leftward in response to counterclockwise rotation of the disk. Disk tooth A may be added to contact slide tooth 36 to limit the leftward shift of the slide by disk tooth 3 and disk tooth 1 may be added to contact slide tooth 38 to limit the leftward shift of the disk by disk tooth C.

For the seventh mode of operation, disk tooth B is required to shift the slide to the right in response to clockwise rotation of the disk and disk tooth C is required for leftward shift of the slide in response to counterclockwise rotation of the disk. Disk tooth 4 may be added to contact slide tooth 38 to limit the rightward shift of the slide by disk tooth B and disk tooth 1 may be added to contact slide tooth 36 to limit the leftward shift of the slide by disk tooth C.

For the eighth mode of operation, disk tooth 3 is required for cooperation with slide tooth 38 for leftward shift of the slide in response to clockwise rotation of the disk and disk tooth 2 is required for cooperation with the same slide tooth for rightward shift of the slide in response to counterclockwise rotation of the disk. Disk tooth A may be added to contact slide tooth 36 to limit the left ward shift of the slide by disk tooth 3 and disk tooth D may be added to contact the same slide tooth to limit rightward shift of the slide by disk tooth 2.

No disk teeth are required for the ninth mode of operation wherein the slide responds to neither clockwise nor counterclockwise rotation of the disk. It may be desirable, however, to provide positive means to ensure that the slide will stay in neutral and for this purpose disk teeth A and 4 may be added to lock the slide in neutral in response to clockwise rotation of the disk and disk teeth D and 1 may be added to lock the slide in neutral in response to counterclockwise rotation of the disk.

From the foregoing review of Table I it is apparent that: slide tooth 36 and disk tooth B provide a pair of actuating shoulders to move the slide to the right in response to clockwise rotation of the disk and slide tooth 38 together with disk tooth 4 provides a pair of stop shoulders that cooperate with the actuating shoulders to stop the slide tooth at its right limit position; slide tooth 36 together with disk tooth C provides a pair of actuating shoulders to shift the slide tooth to the left in response to counterclockwise rotation of the disk and slide tooth 38 together with disk tooth 1 provides a pair of stop shoulders cooperating with the actuating shoulders to stop the slide at its left limit position; slide tooth 38 together with disk tooth 3 provides a pair of actuating shoulders for leftward shift of the slide in response to clockwise rotation of the disk and slide shoulder 35 together with disk shoulder A provides a pair of stop shoulders to cooperate with the pair of actuating shoulders to stop the disk at its leftward position; slide disk tooth 38 together with disk tooth 2 provides a pair of actuating shoulders for rightward shift of the slide in response to counterclockwise rotation of the disk and slide shoulder 36 together with disk shoulder D provides a pair of stop shoulders to stop the slide at its right limit position.

In operating modes 1–4 of Table I, the slide tooth 36 together with disk teeth A and D and slide tooth 38 together with disk teeth 1 and 4 provide pairs of stop shoulders to cooperate with pairs of actuating shoulders to determine a limit position of the slide. But also in operating modes 1–4 as well as in operating mode 9, the same pairs of stop shoulders may serve as locking shoulders to lock the slide in neutral in response to rotation of the disk to a limit position. In modes 1, 3 and 9 the slide shoulder 36 together with disk shoulder A forms a pair of locking shoulders and slide shoulder 38 and disk shoulder 4 form a second pair of locking shoulders which cooperate with the first pair to lock the slide in neutral in response to clockwise rotation of the disk to a neutral position; and in modes 2, 4 and 9 slide tooth 36 together with disk tooth D provides a first pair of locking shoulders and slide tooth 38 together with disk tooth 1 provides a second pair of locking shoulders which cooperates with the first pair of locking shoulders to lock the disk in neutral when the disk is rotated counterclockwise to a limit position.

In the second embodiment of the invention illustrated by FIGS. 3–14, a rectangular slide 14 is employed to actuate a four-way valve or the like. Each of the two longitudinal side portions of a silde 14 that straddle a rotary control disk is provided with two spaced recesses and an intermediate lug. Thus, as shown on an enlarged scale in FIG. 3, the upper longitudinal side potrion of the slide 14 is provided with two spaced recesses 42 and 44 with a lug 45 intermediate the two recesses. The two recesses 42 and 44 form corresponding pairs of confronting shoulders in what may be termed an outer longitudinal zone of the slide and the lug 45 forms two oppositely facing shoulders in what may be termed an inner longitudinal zone of the slide. In like manner, the lower longitudinal side portion of the slide 14 is provided with two recesses 46 and 48 together with an intermediate lug 50.

FIG. 4 shows the profile configuration of a first rotary control disk 52 that may be employed for some of the nine modes of operation and FIG. 5 shows the profile configuration of a second rotary control disk 54 that may be employed for the remaining of the nine modes of operation.

The first control disk 52 has three radial teeth designated W, X and Y, which are shaped and dimensioned to enter the various slide recesses 42, 44, 46 and 48, the three teeth forming three pairs of oppositely facing peripheral shoulders in an outer radial zone of the controlled disk to cooperate with the shoulders in the outer longitudinal zones of the slide. In addition, the control disk 52 is formed with five shoulders designated a, b, c, d and e, respectively which constitute shoulders in an inner radial zone of the control disk to cooperate with the inner zone shoulders of the slide that are formed by the two lugs 45 and 50.

The second disk 54, shown in FIG. 5, has two radial teeth R and S dimensioned to enter the recesses 42, 44, 46 and 48 of the slide, the two teeth providing two pairs of oppositely facing shoulders in an outer radial zone of the disk to cooperate with the shoulders in the outer longitudinal zones of the slide. The second control disk 54 is further provided with six shoulders designated f, g, h, j, k and l, respectively, which constitute peripheral shoulders in an inner radial zone of the rotary disk to cooperate with inner zone shoulders of the slide that are formed by the lugs 45 and 50.

shift the slide to the right until it is stopped by an inner zone shoulder of the disk contacting slide lug 45.

Referring to the fourth mode of operation in FIG. 9 where disk 52 is reversed, clockwise rotation of the disk causes tooth X to shift the slide to the left until the slide is stopped by an inner zone shoulder of the disk contacting slide lug 45 and counterclockwise rotation of the disk causes the slide to be locked in neutral by inner zone shoulders of the disk contacting slide shoulders 45 and 50 respectively.

Referring to the fifth mode of operation in FIG. 10 where disk 52 is also reversed, clockwise rotation of the disk causes tooth W of the disk to shift the slide to the right until it is stopped by an inner zone shoulder of the disk cooperating with slide lug 50 and counterclockwise rotation of the disk causes tooth Y of the disk to move the slide to the right until it is stopped by abutment of an inner zone shoulder of the disk against the slide lug 45.

In FIG. 11 which relates to the sixth mode of operation, clockwise rotation of the disk 52 causes tooth Y to shift the slide to the left until it is stopped by an inner zone shoulder of the disk abutting lug 45 and counterclockwise rotation of the disk causes tooth W to shift the slide to the left until it is stopped by abutment of an inner zone shoulder of the disk against lug 50.

In FIG. 12 which relates to the seventh mode of operation, clockwise rotation of disk 54 causes tooth R to shift the slide rightward until it is stopped by an inner zone shoulder of the disk contacting lug 50 and counterclockwise rotation of the disk causes tooth S to move the slide

TABLE II

| Mode of operation: | Response of slide to clockwise rotation of the control disk | Response of slide to counter-clockwise totation of the control disk | Control disk that is used | Active teeth and shoulders |
|---|---|---|---|---|
| 1 | Locked in neutral | Shifts left | 52 | X, a, c, d |
| 2 | Shifts right | Locked in neutral | ¹ 52 | X, a, c, d |
| 3 | Locked in neutral | Shifts right | 52 | X, a c, d |
| 4 | Shifts left | Locked in neutral | 52 | X, a, c, d |
| 5 | Shifts right | Shifts right | ¹ 52 | W, Y, b, e |
| 6 | Shifts left | Shifts left | 52 | W, y, b, e |
| 7 | Shifts right | do | 54 | R, S, j, k |
| 8 | Shifts left | Shifts right | 54 | R, S, j, k |
| 9 | Locked in neutral | Locked in neutral | 54 | f, g, h, l |

¹ Reversed.

FIGS. 6–14 show the control disks at their neutral positions for each of the nine modes of operation of the control mechanism. Table II indicates which of the two disks 52 and 54 is employed for each mode of operation and further indicates the teeth and shoulders of the disks that are active in each of the modes. It is to be noted that the control disk 52 is reversed, i.e. turned over for operation in modes 2, 4 and 5.

In the first mode of operation indicated by FIG. 6, clockwise rotation of the control disk causes inner zone shoulders of the disk to lock the slide in neutral and counterclockwise rotation of the disk causes tooth X to move the slide to the left until it is stopped by abutment of an inner zone shoulder of the disk with the slide lug 50.

Referring to the second mode of operation in FIG. 7, where disk 52 is reversed, clockwise rotation of the disk causes tooth X to shift the slide to the right until it is stopped by abutment of an inner zone shoulder of the disk with the slide lug 50, and counterclockwise rotation of the disk locks the slide in neutral by the cooperation of the inner zone shoulders of the disk with the slide lugs 45 and 50 respectively.

In FIG. 8 which relates to the third mode of operation clockwise rotation of the disk results in the slide being locked in neutral position by inner zone shoulders of the disk cooperating with lugs 45 and 50 of the slide and counterclockwise rotation of the disk causes tooth X to to the left until it is stopped by abutment of an inner zone shoulder of the disk against lug 50.

In FIG. 13 which relates to the eighth mode of operation, clockwise rotation of disk 54 causes tooth R to shift the slide to the left until it is stopped by an inner zone shoulder of the disk abutting lug 45 and counterclockwise rotation causes the tooth S to move the slide to the right until the slide is stopped by abutment of an inner zone shoulder of the disk against lug 45.

In FIG. 14 which relates to the ninth mode of operation, clockwise rotation of the disk 54 causes the slide to be locked in neutral by an inner zone shoulder of the disk abutting lugs 45 and 50 respectively and counterclockwise rotation of the disk also causes the slide to be locked in neutral by other inner zone shoulders of the disk abutting lugs 45 and 50.

From the foregoing discussion of the second embodiment of the invention it is apparent that pairs of actuating shoulders, pairs of stop shoulders and pairs of locking shoulders are provided to function in the same basic manner as in the first embodiment of the invention. Thus recesses 42 and 44 of the slide together with teeth W, X and Y of the disk provide pairs of actuating shoulders for shifting the slide; slide lug 45 together with shoulders a–e of the disk form various pairs of stop shoulders for operating modes 1–8 and also form locking shoulders to lock the slide in neutral in the operating modes 1–4 and 9.

FIG. 15 shows diagrammatically a control system in which two slides 55 and 56 are connected to the spools or two four-way valves 58 and 60 respectively, the two slides being controlled by corresponding rotary control disks on a control shaft 62. The control shaft 62 is slidingly and rotatably mounted in fixed structure 64 and is operated by a control lever 65 having a hub portion 66 that is rotatably mounted on the control shaft. A rocker arm 70 has a hub portion 72 by means of which it is fixedly mounted on the control shaft 62 to control the rotary position of the shaft.

In the construction shown, the hub portion 72 of the rocker arm 70 is cut away to provide two shoulders 74 and 75 to cooperate with a pin 76 on the hub portion 66 of the control lever 65. At the position of the rocker arm 70 relative to the control shaft 62 that is shown in FIG. 16, the shoulder 74 of the hub portion 72 abuts the pin 76 but the rocker arm may be rotated 90 degrees counterclockwise to bring the second shoulder 75 against the pin 76.

Fixedly mounted on the control lever 65 is a pneumatic power cylinder 78 having two hose connections 80 and a piston 82 inside the cylinder is connected by a piston rod 84 to the rocker arm 70. In the construction shown, a cross pin 85 on the end of the piston rod 84 engages a slot 86 in the outer end of the rocker arm.

The control lever 65 has a handle 88 with a control knob 90 on the outer end of the handle. The control knob 90 operates a suitable switch (not shown) for remote control of a suitable four-way valve (not shown) that is operable to cause the power cylinder to swing the rocker arm 70 between its two opposite limit positions.

Fixedly mounted on the control shaft 62 is a pair of rotary control disks 92 and 94 for cooperation with the slide 55 and a pair of rotary control disks 95 and 96 for coopeartion with the slide 56. In FIG. 15, the control shaft 62 is at an intermediate position in its range of axial movement and none of the four rotary control disks 92, 94, 95 and 96 is positioned to cooperate with a slide so that the two four-way valves 58 and 60 are free for manual operation by corresponding handles 98.

If control shaft 62 is shifted rightward by means of control lever 65, rotary control disk 92 is positioned to cooperate with slide 55 and rotary control disk 95 is positioned to cooperate with slide 56. On the other hand, if control shaft 62 is shifted to the left, rotary control disk 94 is positioned to cooperate with slide 55 and rotary control disk 96 is positioned to cooperate with slide 56.

While the control shaft 62 is at its neutral or intermediate position, the control knob 90 may be manipulated to swing rocker arm 70 from either of its two limit positions to its opposite limit position. This capability of the control shaft 62 and the disks thereon to rotate through an angle of 90° relative to control lever 65 permits different modes of operation of slides 55 and 56 by the control lever.

Referring to FIGS. 6–14, it is apparent that the neutral position of disk 52 in FIG. 9 is 90° away from the neutral position of the same disk in FIG. 10; the neutral position of disk 52 in FIG. 8 is 90° from the neutral position of the same disk in FIG. 11; the neutral position of disk 52 in FIG. 6 is 90° from the neutral position of the same disk in FIG. 11; and the neutral position of disk 54 in FIG. 12 is 90° from the neutral position of the same disk in FIG. 14.

With control shaft 62 at its rightward limit position, as viewed in FIG. 15, disk 92 may control slide 55 in accord with operating mode 9 and disk 95 may control slide 56 in accord with operating mode 8. If control shaft 62 is shifted momentarily to its intermediate position and power cylinder 78 is actuated to rotate control shaft 62 90°, the control shaft may be returned to its rightward position to cause disk 92 to control slide 55 in accord with mode of operation 10 and to cause disk 95 to control slide 56 in accord with operating mode 11.

On the other hand, with control shaft 62 shifted to its leftward limit position, disk 94 may control slide 55 in accord with operating mode 6, and disk 96 may control slide 56 in accord with operating mode 12. Disengaging the two disks long enough to rotate the two disks 90° results in disk 94 controlling slide 55 in accord with operating mode 11 and disk 96 controlling slide 56 in accord with operaing mode 14. Thus, the arrangement shown in FIG. 15 permits manual operation of the two four-way valves, if desired, and further provides choice among four different operaing cycles of the two four-way valves 58 and 60 in response to manipulation of control handle 88.

My description in specific detail of the selected embodiments of the invention will suggest various changes, substitutions and other departures from my disclosure.

I claim:

1. In a control mechanism of the character described, the combination of:

a rotary control member having an operating range comprising rotation in one direction from a neutral position to a first limit position and rotation from the neutral direction in the opposite direction to a second limit position;

a controlled member shiftable along a path through a corresponding range including a corresponding neutral position and corresponding first and second limit positions, said controlled member having a first longitudinal portion and a second longitudinal portion parallel to said path, said two longitudinal portions straddling the rotary control member adjacent opposite sides of the periphery of the rotary control member, a pair of actuating shoulders comprising a shoulder on the periphery of the rotary control member and a shoulder on said first longitudinal portion of the controlled member to make mutual contact to apply force to the controlled member in one direction thereof to drive the controlled member in said one direction out of its neutral position in response to rotation of the rotary control member in one rotary direction out of its neutral position; and a pair of stop shoulders comprising a shoulder on the periphery of the rotary control member and a shoulder on the second of said longitudinal portions of the controlled member to make mutual contact to apply force to the controlled member in the opposite longitudinal direction in response to rotation of the control member in said one direction, said pair of stop shoulders being located relative to the pair of actuating shoulders to cooperate therewith to immobilize the controlled member at a limit position in said one longitudinal direction.

2. A combination as set forth in claim 1 which includes a second pair of actuating shoulders comprising a shoulder on the periphery of the rotary control member and a shoulder on said first longitudinal portion of the control member to make mutual contact to apply force to the controlled member in the opposite longitudinal direction thereof to drive the controlled member in said opposite longitudinal direction from its neutral position in response to rotation of the rotary control member in the opposite rotary direction from its netural position.

3. A combination as set forth in claim 2 which includes spring means to return the controlled member in both directions to its neutral position.

4. A combination as set forth in claim 2 which includes a second pair of stop shoulders, the second pair of shoulders comprising a shoulder on the periphery of the rotary control member and a shoulder on the second of said longitudinal portions of the controlled member to make mutual contact to apply force to the controlled member in said one longitudinal direction thereof in response to the rotation of the controlled member in said opposite direction, said second pair of stop shoulders being located relative to the second pair of actuating shoulders to cooperate with the second pair of actuating shoulders to immoblize the controlled member at a limit position in said opposite longitudinal direction.

5. A combination as set forth in claim 4 in which the peripheral shoulders of the rotary control member include peripheral shoulders cooperative with shoulders of the controlled member to return the controlled member from its two opposite limit positions in response to return rotation of the rotary control member from its corresponding two opposite limit positions to its neutral position.

6. A combination as set forth in claim 1 which includes a first pair of locking shoulders comprising a shoulder on the periphery of the rotary control member and a shoulder on the said first longitudinal portion of the control member to make mutual contact when the control member is rotated in the opposite rotary direction out of its neutral position to a second limit position; and
   a second pair of locking shoulders comprising a shoulder on the periphery of the rotary control member and a shoulder on the second longitudinal portion of the controlled member to make mutual contact at said second limit position to cooperate with the first pair of locking shoulders to immobilize the controlled member at the neutral position of the controlled member.

7. A combination as set forth in claim 1 which includes a second pair of actuating shoulders comprising a shoulder on the periphery of the rotary drive member and a shoulder on said second longitudinal portion of the controlled member to make mutual contact to drive the controlled member from its neutral position in said one longitudinal direction in response to rotation of the rotary control member in its opposite rotary direction out of its neutral position,
   whereby rotation of the rotary control member in either rotary direction out of its neutral position drives the controlled member in said one longitudinal direction.

8. A combination as set forth in claim 7 which includes a second pair of stop shoulders comprising a shoulder on the periphery of the rotary control member and a shoulder on the first longitudinal portion of the controlled member to make mutual contact to apply force to the controlled member in the opposite longitudinal direction thereof in response to rotation of the rotary control member in said opposite rotary direction,
   said second pair of stop shoulders being located relative to said second pair of actuating shoulders to cooperate therewith to limit the shifting of the controlled member by rotation of the rotary control member in said opposite rotary direction from its neutral position.

9. A combination as set forth in claim 1 which includes spring means to return the controlled member from its limit position to its neutral position.

10. A combination as set forth in claim 1 in which the peripheral shoulders of the rotary control member include at least one peripheral shoulder cooperative with a shoulder of the control member to return the controlled member from a limit position to its neutral position in response to return rotation of the rotary control member from its corresponding limit position to its neutral position.

11. In a control mechanism of the character described, the combination of:
   a rotary control member having an operating range comprising rotation in one direction from a neutral position to a first limit position and rotation from the neutral direction in the opposite direction to a second limit position;
   a controlled member shiftable along a path through a corresponding range including a corresponding neutral position and corresponding first and second limit positions, said controlled member having a first longitudinal portion and a second longitudinal portion parallel to said path, said two longitudinal portions straddling the rotary control member adjacent opposite sides of the periphery of the rotary control member;
   a first pair of actuating shoulders comprising a shoulder on the periphery of the rotary control member and a shoulder on said first longitudinal portion of the controlled member to make mutual contact to apply force to the controlled member in one direction thereof to drive the controlled member in said one direction out of its neutral position in response to rotation of the rotary control member in one rotary direction out of its neutral position; and
   a second pair of actuating shoulders comprising a shoulder on the periphery of the rotary drive member and a shoulder on said second longitudinal portion of the controlled member to make mutual contact to drive the controlled member from its neutral position in said one longitudinal direction in response to rotation of the rotary control member in its opposite rotary direction out of its neutral position,
   whereby rotation of the rotary control member in either rotary direction out of its neutral position drives the controlled member in said one longitudinal direction.

12. In a control mechanism, the combination of:
   a rotary control member having an operating range comprising clockwise rotation from a neutral position to a first limit position and counterclockwise rotation from the neutral position to a second opposite limit position; and
   a controlled member shiftable through a corresponding operating range including a corresponding neutral position and corresponding first and second limit positions,
   said controlled member having a first longitudinal portion adjacent one side of the periphery of the control member and a second longitudinal portion adjacent the other side of the periphery of the control member, said first and second longituidnal portions having shoulders presented to the rotary control member,
   said rotary control member having peripheral shoulders for cooperation with said shoulders of the controlled member to shift the controlled member out of its neutral position in response to rotation of the rotary control member out of its neutral position,
   said controlled member having a given mode of operation with respect to its response to opposite rotations of the rotary control member from the neutral position of the rotary control member; and
   in which the periphery shoulders of the rotary control member are so distributed about the periphery thereof that the rotary control member may be disengaged from the controlled member, rotated through a given angle of less than 360°, and again engaged with the controlled member for a mode of operation different from said given mode of operation.

13. A combination as set forth in claim 12 which includes means to move said rotary control member out of engagement with the controlled member; and
   which includes means to rotate the rotary control member when it is out of engagement with the controlled member for change in the mode of operation of the controlled member.

14. A combination as set forth in claim 13 in which said rotary control member is mounted on a control shaft and said control shaft is movable axially to move the controlled member into and out of a position at which it is effective to shift the controlled member.

15. A combination as set forth in claim 14 which includes:
   means to actuate said control shaft; and
   means operatively connecting said control shaft to the actuating means, said connecting means being adjustable to change the rotary position of the control shaft relative to the actuating means through said given angle.

16. In a control mechanism, the combination of:
a rotary control member having an operating range comprising clockwise rotation from a neutral position to a first limit position and counterclockwise rotation from the neutral position to a second limit position; and
a controlled member shiftable through a corresponding operating range including a corresponding neutral position and corresponding first and second limit positions,
said controlled member having a first portion adjacent the periphery of the rotary control member on one side thereof and having a second longitudinal portion adjacent the periphery of the rotary control member on the oppoiste side thereof,
each of said two portions of the controlled member having shoulders in an outer zone and shoulders in an inner zone,
said rotary control member having peripheral shoulders in an outer radial zone to cooperate with said outer zone shuolders of the controlled member to shift the controlled member,
said rotary control member having peripheral shoulders in an inner radial zone to cooperate with said inner zone shoulders of the controlled member to limit shifting movement of the controlled member.

17. A combination as set forth in claim 16 in which at least one of the inner zone peripheral shoulders of the rotary control member cooperates with an inner zone shoulder of the controlled member to block shifting of the controlled member at one of its limit positions.

18. A combination as set forth in claim 16 in which two of said inner zone shoulders of the rotary control member cooperate with two of said inner zone shoulders of the controlled member to immobilize the controlled member at its neutral position in response to rotation of the rotary control member to one of its two limit positions.

19. In a control mechanism, the combination of:
a controlled member shiftable from a neutral position to two opposite limit positions,
said controlled member having two laterally spaced portions with sets of shoulders on the inner sides of the two portions respectively;
a first rotary control member and a second rotary control member, each rotatable in opposite directions from a neutral position to two opposite limit positions,
said first rotary control member having peripheral shoulders to engage shoulders of said two sets of shoulders to cause one mode of operation of the controlled member in response to opposite rotations of the first rotary control member,
said second rotary control member having peripheral shoulders to engage shoulders of said two sets of shoulders to cause a second mode of operation of the controlled member in response to opposite rotations of the second control member,
said two rotary control members being movable from ineffective positions into and out of effective positions alternately for alternate control of the controlled member.

20. A combination as set forth in claim 19 in which said two rotary control members are mounted on a common control shaft and said control shaft is movable axially to move the two control members from their ineffective positions into and out of their effective positions.

21. In a control mechanism of the character described, the combination of:
a rotary control member;
a controlled member shiftable along a given path, said controlled member having a first longitudinal portion and a second longitudinal portion parallel with said path and straddling the rotary control member adjacent opposite sides of the periphery of the rotary control member;
at least one pair of actuating shoulders comprising a shoulder on the periphery of the rotary control member and a cooperating shoulder on the first longitudinal portion of the controlled member to transmit force from the rotary control member to the controlled member longitudinally thereof; and
at least one pair of actuating shoulders comprising a shoulder on the periphery of the rotary control member and a cooperating shoulder on the second longitudinal portion of the controlled member to transmit force from the rotary control member to the controlled member longitudinally thereof,
the first mentioned pair of actuating shoulders being positioned to be effective during one portion of the rotation of the rotary control member without interference by the second mentioned pair of actuating shoulders,
the second mentioned actuating shoulders being positioned to be effective during a different portion of the rotation to be effective during a different portion of the rotation of the rotary control member without interference by the first mentioned pair of actuating shoulders.

References Cited

UNITED STATES PATENTS

| | | | |
|---|---|---|---|
| 26,958 | 1/1860 | Walker | 74—89.17 |
| 719,595 | 2/1903 | Huss | 74—29 |
| 1,150,785 | 8/1915 | Mouton et al. | 74—435 |
| 195,638 | 9/1877 | Nichols | 74—422 |
| 1,389,039 | 8/1921 | Estes | 74—29 |
| 1,522,124 | 1/1925 | Hoisington | 74—422 |
| 2,806,689 | 9/1957 | Miller | 74—422 |

FOREIGN PATENTS

| | | | |
|---|---|---|---|
| 893,364 | 4/1962 | Great Britain | 74—422 |

FRED C. MATTERN, JR., Primary Examiner

W. S. RATLIFF, JR., Assistant Examiner

U.S. Cl. X.R.

74—437